No. 674,015. Patented May 14, 1901.
J. E. RAGSDALE.
BICYCLE BEARING DUST PROTECTOR.
(Application filed Apr. 26, 1900.)
(No Model.)
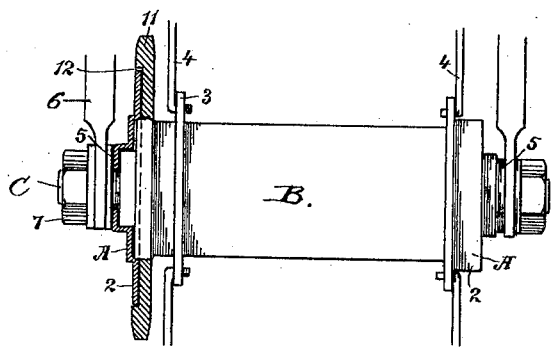
Witnesses,
Inventor,
Joshua E. Ragsdale
By Dewey Strong & Co.
Attys.

UNITED STATES PATENT OFFICE.

JOSHUA E. RAGSDALE, OF FRESNO, CALIFORNIA.

BICYCLE-BEARING DUST-PROTECTOR.

SPECIFICATION forming part of Letters Patent No. 674,015, dated May 14, 1901.

Application filed April 26, 1900. Serial No. 14,377. (No model.)

*To all whom it may concern:*

Be it known that I, JOSHUA E. RAGSDALE, a citizen of the United States, residing at Fresno, county of Fresno, State of California, have invented an Improvement in Bicycle-Bearing Dust-Protectors; and I hereby declare the following to be a full, clear, and exact description of the same.

My invention relates to means for preventing the ingress of dust and the like to ball-bearings of bicycles; and it consists of the parts and the construction and combination of parts hereinafter described and claimed.

The figure illustrates the rear axle and adjunctive parts of a bicycle and shows the invention applied thereto.

In the accompanying drawing, A represents the protecting-cap, having an annular flange 5, with a central opening of sufficient diameter to allow the outer end of the axle C to pass through the opening. The end of the axle is screw-threaded and passes through the end of the fork 6 and is secured by a nut 7, with the usually interposed washers.

B is the wheel-hub, having a flange 3, to which the spokes 4 are secured.

Upon the side of the rear wheel of the machine the sprocket-wheel 11, over which the driving-chain passes, is interposed between the spokes 4 and the flange of the cap A. I have therefore shown the flange as formed by the cylindrical portion, which extends at right angles with the face of the sprocket-wheel, and it is thence bent outwardly to form a flat disk-like flange 2, which fits and turns in an annular recessed channel 12, formed in the face of the sprocket-wheel. The outer face of the flange 2 is substantially flush with the outer face of the sprocket-wheel, and the outer periphery of this disk flange runs in close proximity with the inner periphery of the recess, but out of contact therewith, so that no friction is produced, and the overhanging periphery of the recess serves to prevent ingress of dust in the same manner that the overhanging of the spokes upon the other end of the wheel acts.

Having thus described my invention, what I claim as new, and desire to secure by Letters Patent, is—

In an improved dust-protector and in combination with an axle, and a wheel-hub mounted thereon, and a sprocket-wheel having a wide annular channel of shallow depth in its face, said wheel mounted on the hub, the protector consisting of a cap having a central opening for the axle, a bent portion inclosing the end of the hub, and a wide vertical flange fitting the channel in the sprocket-wheel but out of direct contact with the inner periphery thereof, the outer face of the flange being substantially flush with the outer face of the sprocket-wheel whereby the overhanging wall of said channel prevents ingress of dust to the bearing.

In witness whereof I have hereunto set my hand.

JOSHUA E. RAGSDALE.

Witnesses:
WM. H. PULESTON,
JACOB HOCKENBURY.